United States Patent
Skrobko et al.

(10) Patent No.: US 6,674,967 B2
(45) Date of Patent: Jan. 6, 2004

(54) FIBER-TO-THE-HOME (FTTH) OPTICAL RECEIVER HAVING GAIN CONTROL AND A REMOTE ENABLE

(75) Inventors: John Skrobko, Berkeley Lake, GA (US); Robert R. Riggsby, Atlanta, GA (US)

(73) Assignee: Scientific-Atlanta, Inc., Lawrenceville, GA (US)

(*) Notice: Subject to any disclaimer, the term of this patent is extended or adjusted under 35 U.S.C. 154(b) by 175 days.

(21) Appl. No.: 09/992,891

(22) Filed: Nov. 14, 2001

(65) Prior Publication Data

US 2003/0090320 A1 May 15, 2003

(51) Int. Cl.[7] .................................................. H04J 14/00

(52) U.S. Cl. ........................... 398/72; 398/58; 398/66; 398/67; 398/71; 398/100; 398/202; 725/127; 725/129

(58) Field of Search ............................... 398/58, 60, 66, 398/70, 71, 72, 76, 78, 100; 725/127–129, 119

(56) References Cited

U.S. PATENT DOCUMENTS

| | | | |
|---|---|---|---|
| 4,395,780 A | 7/1983 | Gohm et al. | ................ 455/607 |
| 5,347,389 A | 9/1994 | Skrobko | .................... 359/189 |
| 5,477,370 A | 12/1995 | Little et al. | ................. 359/189 |
| 5,488,413 A | 1/1996 | Elder et al. | .................... 348/13 |
| 5,528,582 A | * 6/1996 | Bodeep et al. | ............... 370/276 |
| 5,553,064 A | 9/1996 | Paff et al. | ..................... 370/50 |
| 5,822,677 A | 10/1998 | Peyrovian | ................... 455/5.1 |
| 6,147,786 A | * 11/2000 | Pan | ............................... 398/1 |

OTHER PUBLICATIONS

"Components for Fiber Optics, Triplexers—WDM: FSAN—TPM Series," http://www.dco-na.com/data/TriplexerDataSheetSept2001.pdf, Compagnie Deutsch, Division Composants Optiques, St Jean de la Ruelle, France, Sep. 2001.

"Agere Systems Introduces Single–Fiber Network Access Devices for Voice Data Services to the Home or Curb," http://www.agere.com/NEWS/PRESS2001/031901e.html, Agere Systems, Anaheim, CA, Mar. 19, 2001.

Kerven, "CEDaily Direct News," http://www.cedmagazine.com/cedailydirect/0103/cedaily010319.htm, CED Magazine, Mar. 19, 2001.

(List continued on next page.)

*Primary Examiner*—Leslie Pascal
*Assistant Examiner*—M. R. Sedighian
(74) *Attorney, Agent, or Firm*—Kenneth M. Massaroni; Hubert J. Barnhardt, III; Shelley L. Couturier

(57) ABSTRACT

A fiber-to-the-home (FTTH) system transmits forward and reverse optical signals, such as video, voice, and data signals, via optical fiber, and includes a plurality of home network units. The home network units include an FTTH optical receiver for receiving at least one of the video, voice, and data signals. A triplexer distinguishes and separates the video, voice, and data signals, wherein the video signals have a first wavelength and the voice and data signals have a second wavelength. The voice and data signals are provided to the home network unit for further processing. The triplexer provides an electrical signal to the amplifier stages. The amplifier stages include a preamplifier stage and a postamplifier stage. A gain control circuit automatically adjusts the gain of the video signal based upon the input power level to the FTTH optical receiver. Additionally, a tilt network performs level compensation for externally located coaxial cable. A video signal is then provided to a video device located within a home via the coaxial cable.

12 Claims, 4 Drawing Sheets

OTHER PUBLICATIONS

"Lucent Technologies introduces single-fiber network access devices for voice, video, and data services to the home or curb," http://www.lucent.com/press/0600/000606.mea.html, Lucent Technologies, Atlanta, GA, Jun. 6, 2000.

"A Broadband Optical Access System with Increased Service Capability by Wavelength Allocation," ITU Telecommunications Standardization Sector Temporary Document 040 (PLEN), Study Group 15, ITU–T Recommendation G.983.wdm; Feb. 5–9, 2001, pps. 1–66.

* cited by examiner

FIBER-TO-THE-HOME (FTTH) OPTICAL RECEIVER HAVING GAIN CONTROL AND A REMOTE ENABLE

FIELD OF THE INVENTION

The present invention relates to fiber-to-the-home (FTTH) optical transmission systems and more particularly to an FTTH optical receiver used in such system having gain control and a remote enable for receiving and processing video, voice, and data optical signals.

BACKGROUND OF THE INVENTION

In recent years there has been a great deal of interest in the transmission of video, voice, and data signals via optical fiber that is pulled to the home, i.e., fiber-to-the-home (FTTH) systems. Traditionally, cable operators have provided video and data signals over a hybrid fiber/coaxial cable (HFC) system. In this manner, optical signals are sent via optical fiber for transmission over longer distances. The optical signals are later converted to radio frequency (RF) signals for further transmission over coaxial cable before entering the home. Moreover, telephone operators have traditionally provided voice and data signals via optical fiber that is pulled to the home, and the signals then enter the home via twisted pair cable. When Congress passed the 1996 Telecommunications Act to promote competition in the telecommunications industry, a small number of cable and telephone operators expanded their services to provide numerous signals (e.g., video, voice, and data) over their system infrastructure. A few larger cable operators have been successful in providing telephony along with video and data signals, but they have deployed traditional telephony circuit-switched platforms due to the significantly different delivery requirements of the video signals compared with the delivery requirements of the voice and data signals. More recently, cable operators that wish to provide telephony signals are delaying the project as the traditional circuit-switched technology migrates to Internet Protocol (IP) based telephony. As a result, there has not been as much immediate incentive for the traditional cable operator to upgrade their existing HFC system to an FTTH system. Conversely, traditional telephone operators continue pulling fiber closer to the curb (i.e., fiber-to-the-curb (FTTC)) or home to deliver voice and data signals. They have not been, however, able to effectively deliver video services over the FTTC or FTTH system infrastructure, once again, due to the significant difference in system requirements for the delivery of video signals.

As the demand for video, voice, and data services continues to grow, however, optical fiber solutions continue to gain momentum over the traditional HFC and telephony systems for both the cable and telephone operators. In addition, there are several advantages for utilizing optical fiber that is pulled closer to the home for providing cable and telephone services. Advantageously, optical fiber systems typically enjoy a high signal quality; lower maintenance and easier troubleshooting; a low attenuation rate; and easy system expansion, to name but a few. Conversely, some of the disadvantages with an HFC system are the limited bandwidth; limited protocol; and that the HFC system must be upgraded for expandability.

What is needed, therefore, is an optical receiver that is capable of offering a complete package of broadband services including video, voice, and data signals over a fiber-to-the-home (FTTH) system. The FTTH optical receiver needs to provide not only voice and data signals in the conventional telephony manner, but additionally, provide video signals without compromising the quality in comparison with the quality of the signal transmitted by the conventional HFC system.

BRIEF DESCRIPTION OF THE DRAWINGS

FIG. 3 illustrates a block diagram of a second embodiment of the FTTH optical receiver in accordance with the present invention.

DETAILED DESCRIPTION OF A PREFERRED EMBODIMENT

The present invention will be described more fully hereinafter with reference to the accompanying drawings in which like numerals represent like elements throughout the several figures, and in which exemplary embodiments of the invention are shown. This invention may, however, be embodied in many different forms and should not be construed as limited to the embodiments set forth herein; rather, the embodiments are provided so that this disclosure will be thorough and complete, and will fully convey the scope of the invention to those skilled in the art. The present invention is described more fully hereinbelow.

Figure 1:
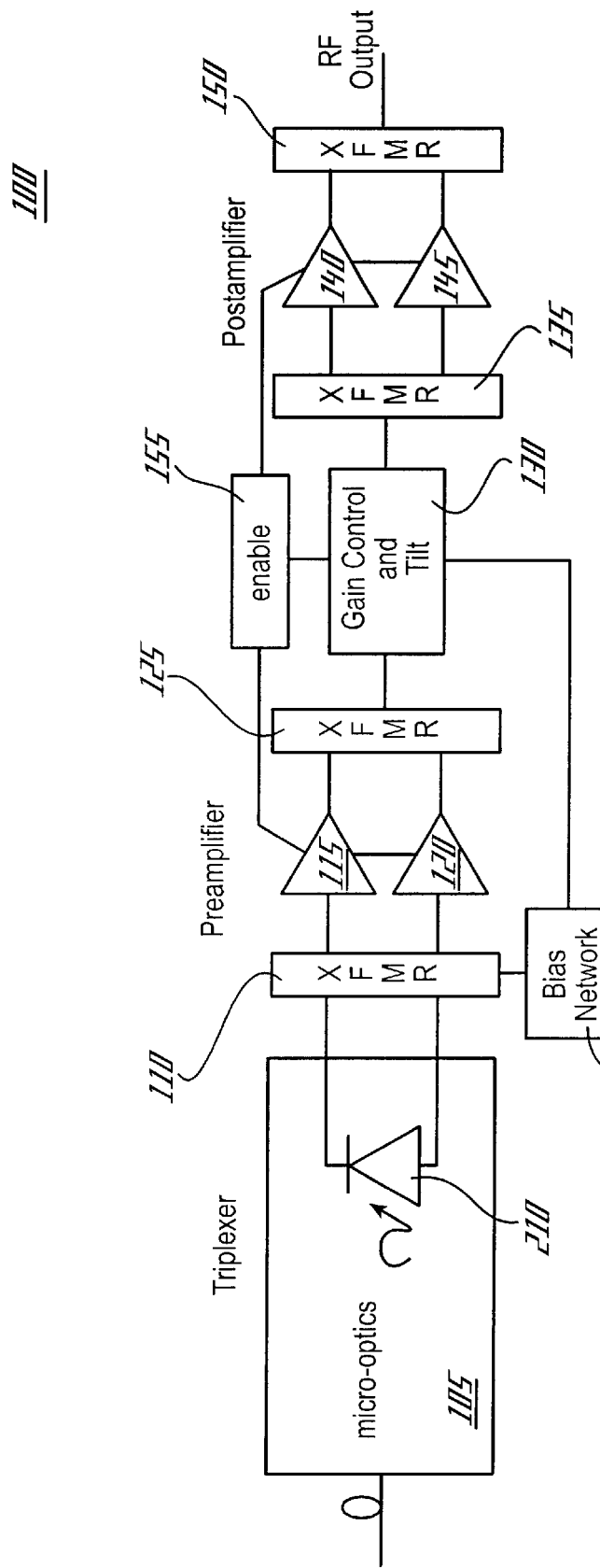
FIG. 1 illustrates a block diagram of a first embodiment of an FTTH optical receiver in accordance with the present invention.

FIG. 1 illustrates a block diagram of a first embodiment of an FTTH optical receiver 100 in accordance with the present invention. The FTTH optical receiver 100 receives multiple wavelength optical signals including video, voice, and data signals from upstream. For example, video signals may be sent on a 1550 nanometer (nm) wavelength; incoming, or forward, voice and data signals may be sent using a 1490 nm wavelength; and outgoing, or reverse, voice and data signals may be sent using a 1310 nm wavelength. It will be appreciated that wavelengths may differ depending on the fiber equipment used throughout the FTTH system. The FTTH optical receiver 100 is housed within a home mounted unit, such as an optical network unit (ONU) (not shown). The home mounted unit may include typical telephony circuitry for processing the voice and data signals. The voice and data signals may then be provided to the appropriate home equipment via twisted pair cable in a conventional manner. It will be appreciated that the present invention is not limited to an FTTH system. More specifically, the present invention can also be used in an FTTC system, a fiber-to-the-business (FTTB) system, or an HFC system.

In addition to the voice and data signals, the present invention receives and processes video signals. This is a significant improvement over the conventional ONU that processes exclusively voice and data signals. In this manner, a traditional telephone or cable operator that may already have an FTTH system in place can add the FTTH optical receiver 100 to an existing ONU and process video, voice, and data signals. Alternatively, a unit can be manufactured that includes the FTTH optical receiver 100. In accordance with the present invention, the video signals provided to the home, via the FTTH optical receiver 100, are of equal or better quality than the video signals that are provided by a conventional HFC system.

Figure 2:
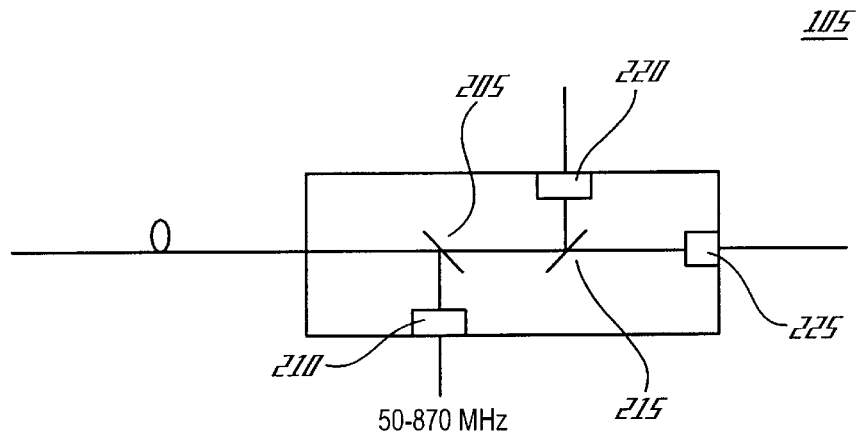
FIG. 2 illustrates a detailed diagram of the triplexer that is suitable for use in the FTTH optical receiver of FIG. 1.

Referring now to FIG. 1, a triplexer 105 in accordance with the present invention distinguishes and separates the different signals having varying wavelengths. These separated signals are then provided to appropriate devices within the ONU or the FTTH optical receiver 100 for further processing. FIG. 2 illustrates a detailed diagram of the triplexer 105 that is suitable for use in the FTTH optical receiver 100. The triplexer 105 receives the optical signals and, depending upon the wavelength of the received signals, routes them to an appropriate internal photodiode. More specifically, a video mirror 205 reflects the video signals determined by the wavelength to a video photodiode 210. Currently, the preferable wavelength for transmitting video signals is at 1550 to 1560 nm due to existing fiber equipment; low losses in the fiber at this wavelength; EDFA technology; and the availability of lasers, to name a few. The video photodiode 210 provides video signals in a forward frequency to amplifier stages within the FTTH optical receiver 100. A typical forward frequency used for video signals is from 50 to 870 Mega Hertz (MHz). A second mirror 215 reflects a second wavelength, for example, 1490 nm, to a second photodiode 220. The second photodiode 220 then outputs a digital stream at, for example, 155 mega bits per second (mbps) that includes the voice and data signals. A laser 225 provides an optical digital stream output at, for example, 155 mbps that includes the voice and data signals. The digital photodiode 220 and laser 225 provide the digital streams to and from additional circuitry (not shown) in the ONU for processing in a conventional manner and then to twisted pair cable that is routed throughout the home.

The placement of the video photodiode 210 is critical for performance in the carrier to noise ratio (CNR) specification. More specifically, the video mirror 205 and video photodiode 210 is preferably placed before the second mirror 215 and photodiode 220 and laser 225. Optics polarization characteristics are another design consideration of the triplexer 105. The video mirror 205, lens (not shown), and the video photodiode 210, i.e., the video components of the triplexer 105, should be polarization insensitive. This can be accomplished via a coating material that is applied to these video components. Alternatively, naturally occurring polarization variations could cause excessive fluctuations in video output signals. Further specifications for the triplexer 105 include choosing a video photodiode 210 that is designed for broadband analog video signals. By way of example, JDSU manufactures a video photodiode that is suitable for use in the FTTH optical receiver 100. Additionally, the optical return loss (ORL) for the video signals should be 40 decibels (dB) or better. In comparison, voice and data optical return loss is typically 20 dB; therefore, the return loss for video signals is a significantly tighter specification to achieve. The linearity of the photodiode should be such that it supports a high channel count without significant generation of second and third order distortion products. Proper angling of the photodiode surface as well as antireflection coatings can minimize ORL issues.

Referring again to FIG. 1, the video photodiode 210 has three outputs. Two outputs are provided to a transformer 110 for matching the video signals to a preamplifier stage; a third output (not shown) is a ground pin. It will be appreciated that the matching can be accomplished in a number of ways, but a preferred embodiment of the present invention accomplishes the matching through the transformer 110 and a bias network 112. These also serve to improve the optical receiver noise performance. Further detail regarding the transformer 110 and the bias network 112 is discussed below in conjunction with FIG. 4. The photodiode 210 and the transformer 110 provide two antiphased RF current connections, one at 0° and one at 180°, to the inputs of two push-pull amplifiers 115, 120. The broadband current signals from the photodiode 210 are converted to amplified RF voltage signals in the amplifiers 115, 120 before being coupled to a combining transformer 125.

Amplifier stages 115, 120 and 140, 145 utilize a push-pull application as described in U.S. Pat. No. 5,347,389, the teachings of which are herein incorporated. They are designed to provide sufficient gain to drive a home network that has typical losses associated with a 4-way splitter and coaxial cable. It will be appreciated that the amplifiers in the preamplifier stage and the postamplifier stage could, alternatively, be single ended amplifier stages, as long as their linearity performance is sufficient. Using single ended amplifier stages also eliminates transformers 125 and 135, thereby reducing costs.

A gain control and tilt combination network 130 receives the combined RF signal. The gain control portion of the network 130 compensates for a wide range of input optical power provided by the FTTH system. It will be appreciated that it is possible to construct an FTTH system without requiring a gain control network. In this manner, however, the operator must construct a system with predetermined optical fiber lengths and known RF input levels of the home in order to set the amplifier stages to the appropriate level. It will also be appreciated that if a gain control network is not used, transformers 125, 135 are no longer necessary. In the preferred embodiment of the present invention, however, the gain control portion of the network 130 is provided to accommodate flexibility in systems having varying fiber lengths and RF input levels.

Also included within the network 130 is the tilt network. The tilt network compensates for the coaxial cable losses that are determined by the length of the coaxial cable routed within the home. FIG. 3 illustrates a block diagram of a second embodiment of the FTTH optical receiver in accordance with the present invention. As illustrated, the tilt network 305 is alternatively located at the output of the postamplifier stage 140, 145 and the combining transformer 150. The tilt network includes components such as resistors, inductors, and capacitors arranged in a network that gradually increases attenuation as the frequency decreases. Furthermore, if additional tilt is necessary to compensate for significant cable losses in the home, external tilt devices can be used outside of the FTTH optical receiver 100 in a known manner.

Referring again to FIG. 1, the gain control network 130 is an open loop gain control network that derives the appropriate gain by sensing the optical input power level from the output of the photodiode 210. A predetermined backoff amount is set to maintain an acceptable input signal level to the home. A bridge-tee circuit utilizing PIN diodes, for example, sets the predetermined backoff in the network 130. In this manner, installation of the FTTH optical receiver 100 is simplified by using the predetermined backoff because there is no need to set the output RF level as required by conventional optical receivers and amplifiers. Additionally, the predetermined backoff amount is valid if the Optical Modulation Index (OMI) is known and constant. Alternatively, a more sophisticated gain control network would include an RF filter and a detector in a known manner. The detected level could then be used in a closed loop automatic gain control (AGC) network, which would be useful if the OMI is not known. Moreover, the AGC network could be used for more effective control because OMI can change as a function of channel loading. A less expensive AGC network approach involves limiting the gain variability to either a 0 dB loss or a 10 dB loss. The threshold point can be adjusted to optimize noise performance, but keep the RF output levels within allowable limits. A hysteresis network can also be implemented to control the circuitry and eliminate any oscillatory states around the threshold point.

Figure 4:
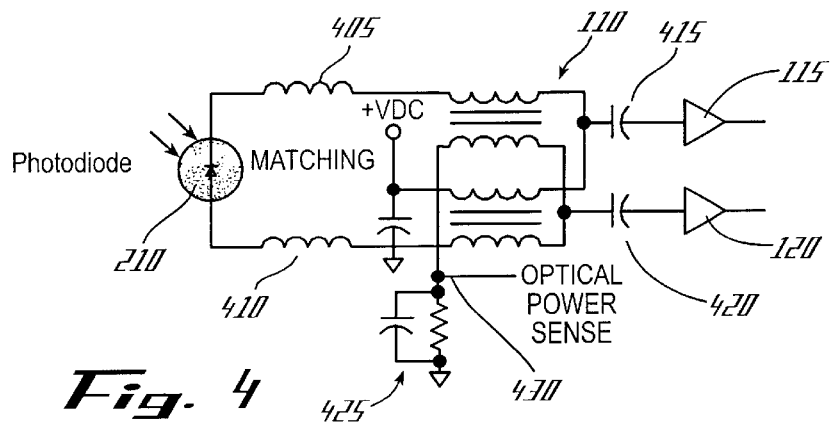
FIG. 4 illustrates an example of the transformer and the bias network shown in FIG. 1 of the present invention.

FIG. 4 illustrates an example of the transformer 110 and the bias network 112 shown in FIG. 1 of the present invention. The photodiode 210 outputs the video signal to matching inductors 405, 410. The transformer network 110 is then used for photodiode biasing and provides an impedance transformation to amplifiers 115, 120. Capacitors 415, 420 are used as direct current (DC) blocking capacitors. In conjunction with the transformer biasing, an optical power sense circuit 425 senses the input power level provided by the FTTH system. The gain control network 130 (FIG. 1) receives the control signal from pin 430 that is indicative of the input power level in order to control the gain appropriately.

Referring again to FIG. 1, it is shown that the gain control portion of the network 130 is an interstage device located between the preamplifier stage and a postamplifier stage. Alternatively, the gain control could be placed at the output of the receiver 100; however, interstage positioning reduces the linearity requirements of the postamplifier. The output of the gain control and tilt network 130 is provided to a transformer 135 for matching the RF signal to two push-pull postamplifiers 140 and 145. A final transformer 150 receives the amplified RF signals and combines the RF signals for transmission through the coaxial cable to, for example, a set-top device.

Figure 5:
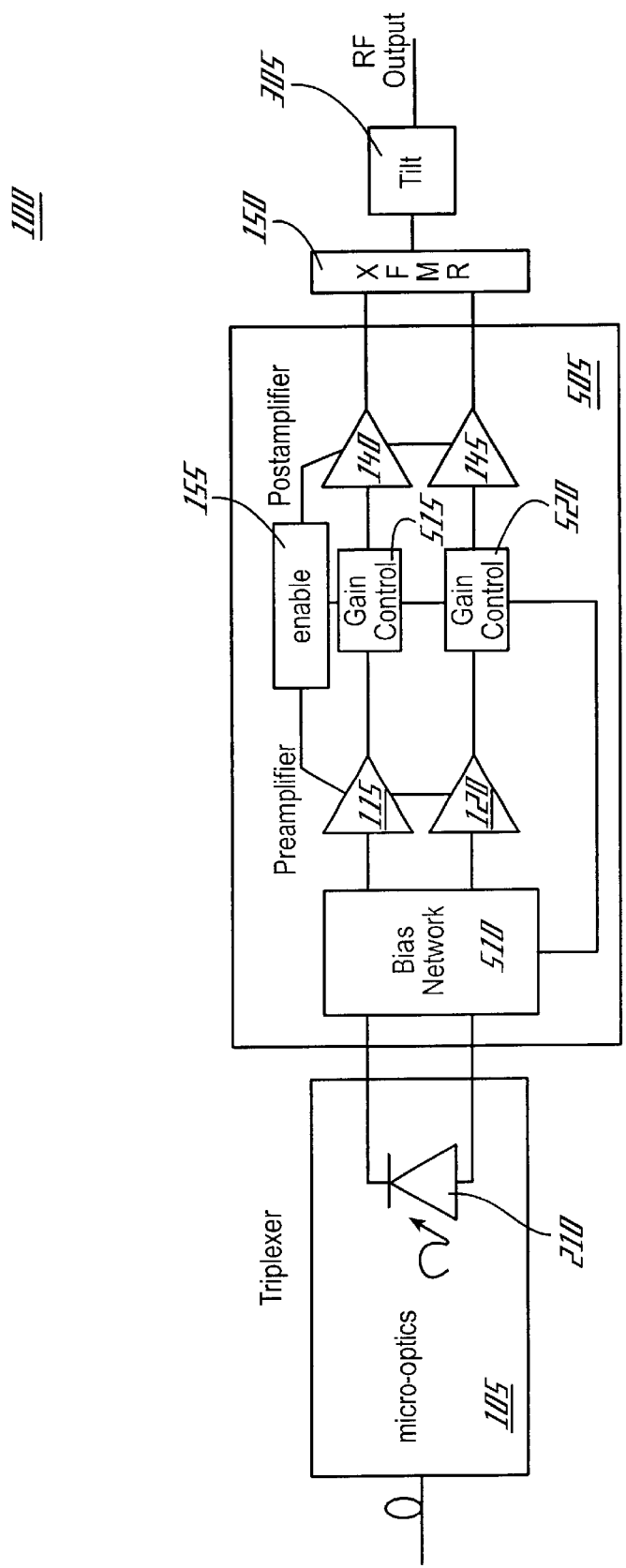
FIG. 5 illustrates a block diagram of a third embodiment of the FTTH optical receiver in accordance with the present invention.

FIG. 5 illustrates a block diagram of a third embodiment of the FTTH optical receiver 100 in accordance with the present invention. As shown, the FTTH optical receiver 100 implements the biasing, amplifying, and gain control within an integrated circuit 505. The integrated circuit 505 can be co-located with the photodiode 210 in the same package or by using the same substrate for both the optical and electrical components of the FTTH optical receiver 100. The integrated circuit 505 receives the video signals from the video photodiode 210. A bias network 510 matches the signal to two push-pull preamplifiers 115, 120. In this embodiment of the present invention, two gain control circuits 515, 520 are used to monitor the appropriate level of the gain by sensing the input power level of the signals. The adjusted video signals are then sent to two push-pull post-amplifiers 140, 145. The amplified signals are then provided to the combining transformer 150 and tilt network 305. The video signal is then provided to an attached coaxial cable for delivery to, for example, a set-top device. In this manner, the two gain control circuits 515, 520 eliminate the requirement for the two transformers 125, 135.

Figure 6:
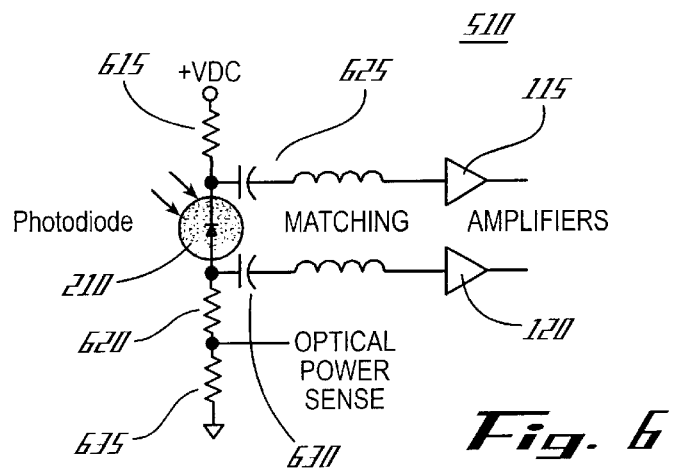
FIG. 6 illustrates an example of the bias network shown in FIG. 5 of the present invention.
Figure 1:
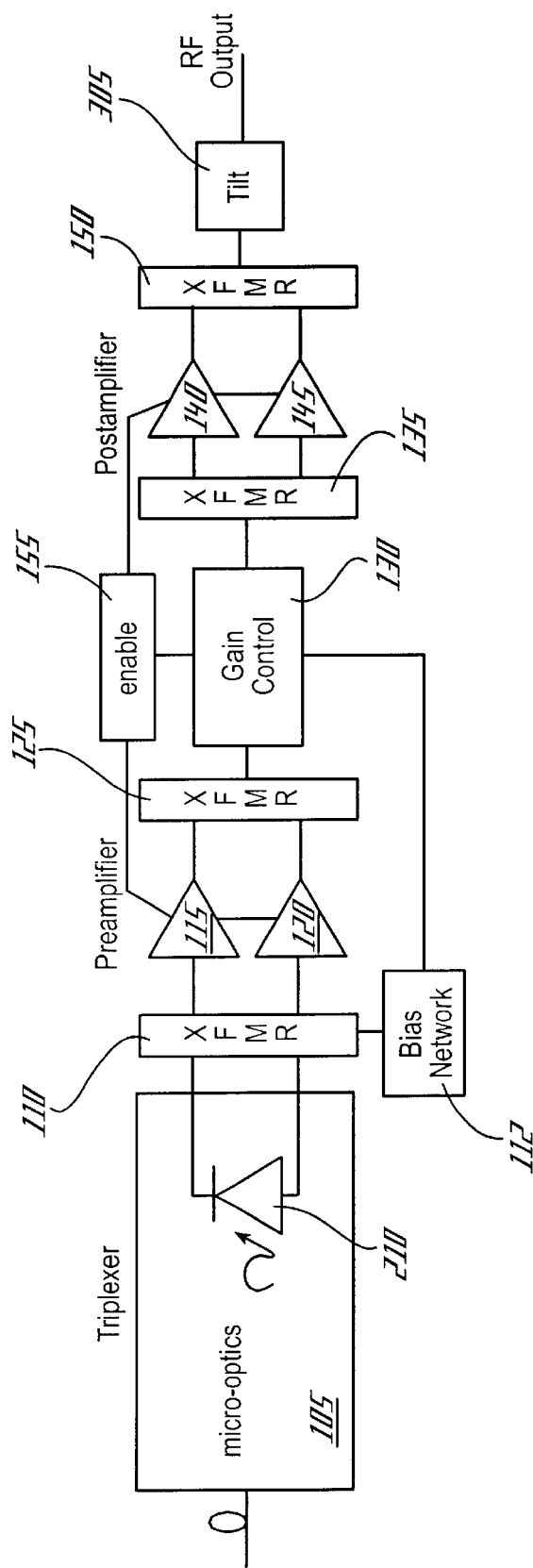

FIG. 6 illustrates an example of the bias network 510 shown in FIG. 5 in accordance with the present invention. The bias network 510 utilizes resistor biasing 615, 620 instead of the transformer biasing as shown in FIG. 4. Alternatively, the resistors could be replaced by RF chokes. The video signal is coupled through the DC blocking capacitors 625, 630. The optical power sense circuit 635 senses the input power signal level and provides the control signal to the gain control circuits 515, 520 (FIG. 5) for appropriate gain control.

Also shown in FIGS. 1, 3, and 6 is an enable circuit 155. At times, an operator may want to connect or disconnect signals having access to a home without having to physically visit the location. The operator can enable or disable the video optical receiver remotely through the FTTH system by sending a signal that uses a different wavelength to a specific FTTH optical receiver 100. The wavelength may provide a digital signal path that may be used for data and voice communications, as well as control functions. The enable function interrupts power to the amplifier stages, thereby providing adequate isolation to shut off the video signals to the home. The bias for the photodiode 210 is maintained, which allows monitoring of the optical signal integrity regardless of the state of the video output. An additional benefit is the reduction in power consumption of the home mounted unit if video service is not desired from that operator. It will be appreciated that the enable circuit 155 is not required.

What is claimed is:

1. In a fiber-to-the-home (FTTH) system for transmitting forward and reverse optical signals, such as video, voice, and data signals, via optical fiber, the FTTH system including a plurality of home network units, the plurality of home network units including an FTTH optical receiver for receiving at least one of the video, voice, and data signals, and for providing amplified video signals to a video device via coaxial cable, the FTTH optical receiver comprising:

a triplexer for distinguishing and separating the at least one of the video, voice, and data signals, and for converting the video signals to video electrical signals, wherein the video signals have a first wavelength and the voice and data signals have a second wavelength, and wherein the at least one of the voice and data signals is provided to a home network unit for further processing;

a biasing network for biasing the video electrical signals; and an amplifier stage for amplifying the video electrical signals, wherein the amplifier stage comprises:
  a preamplifier stage for amplifying the video electrical signals;
  a gain control network for receiving a control signal that is indicative to an input power level at the FTTH optical receiver and for adjusting a gain level associated with the amplified video signals; and
  a postamplifier stage for amplifying the adjusted video signals.

2. The FTTH system of claim 1, wherein the FTTH optical receiver further comprises:
an optical power sense circuit for providing the input power level.

3. The FTTH system of claim 1, wherein the FTTH optical receiver further comprises:
an enable circuit for receiving a control function signal that indicates a power limiting function to the amplifier stage,
wherein when the power limiting function is enabled, the video electrical signals are prevented from being delivered to the video device.

4. The FTTH system of claim 1, wherein the biasing network is a transformer biasing network.

5. The FTTH system of claim 1, wherein the biasing network is a resistor biasing network.

6. In a fiber-to-the-home (FTTH) system for transmitting forward and reverse optical signals, such as video, voice, and data signals, via optical fiber, the FTTH system including a plurality of home network units, the plurality of home network units including an FTTH optical receiver for receiving at least one of the video, voice, and data signals, and for providing amplified video signals to a video device via coaxial cable, the FTTH optical receiver comprising:

a triplexer for distinguishing and separating the at least one of the video, voice, and data signals, and for converting the video signals to video electrical signals, the triplexer comprising:
        a video mirror for deflecting the video signals; and
        a video photodiode for converting the video signals to the video electrical signals;
    a matching network coupled to the video photodiode for matching the video electrical signals;
    a preamplifier stage coupled to the matching network for providing amplified signals;
    a gain control circuit for receiving a control signal and for adjusting a gain level associated with the amplified video signals dependent upon the control signal;
    an optical power sense circuit coupled to the video photodiode for detecting an input power level of the FTTH system, and for providing the gain control circuit the control signal that is indicative of the input power level;
    a postamplifier stage coupled to the gain control circuit for amplifying the adjusted video signals; and
    a tilt circuit for compensating for cable losses present in the coaxial cable routed to the video device.

7. The FTTH system of claim 6, wherein the video mirror in the triplexer is located prior to a second mirror, wherein the second mirror deflects the at least one of the voice and data signals.

8. The FTTH system of claim 6, wherein the video mirror and the video photodiode are polarization insensitive.

9. The FTTH system of claim 6, wherein the video signals have a wavelength of 1550 to 1560 nm.

10. The FTTH system of claim 9, wherein a transformer is coupled to the preamplifier stage for combining the amplified video signals, and wherein a transformer is coupled to the gain control circuit for providing the postamplifier stage with two inputs for the two amplifiers.

11. The FTTH system of claim 6, wherein the preamplifier and postamplifier stages each comprise:

two amplifiers in a push-pull configuration.

12. The FTTH system of claim 6, wherein the FTTH optical receiver further comprises:

an enable circuit for receiving a control function signal that indicates a power limiting function to the amplifier stage,
    wherein when the power limiting function is enabled, the video electrical signals are prevented from being delivered to the video device.

\* \* \* \* \*

UNITED STATES PATENT AND TRADEMARK OFFICE
CERTIFICATE OF CORRECTION

PATENT NO. : 6,674,967 B2
DATED : January 6, 2004
INVENTOR(S) : Skrobko et al.

It is certified that error appears in the above-identified patent and that said Letters Patent is hereby corrected as shown below:

<u>Column 6,</u>
Line 44, delete "adiusting" and insert therefore -- adjusting --

Signed and Sealed this

Twentieth Day of July, 2004

JON W. DUDAS
*Acting Director of the United States Patent and Trademark Office*